US010691709B2

(12) United States Patent
Pidduck et al.

(10) Patent No.: US 10,691,709 B2
(45) Date of Patent: Jun. 23, 2020

(54) SYSTEM AND METHOD FOR SUBSET SEARCHING AND ASSOCIATED SEARCH OPERATORS

(71) Applicant: Open Text SA ULC, Halifax (CA)

(72) Inventors: Patrick Thomas Sidney Pidduck, Waterloo (CA); David Alan Tausky, Waterloo (CA)

(73) Assignee: OPEN TEXT SA ULC, Halifax (CA)

( * ) Notice: Subject to any disclaimer, the term of this patent is extended or adjusted under 35 U.S.C. 154(b) by 546 days.

(21) Appl. No.: 15/331,327

(22) Filed: Oct. 21, 2016

(65) Prior Publication Data

US 2017/0124162 A1 May 4, 2017

Related U.S. Application Data

(60) Provisional application No. 62/247,324, filed on Oct. 28, 2015.

(51) Int. Cl.
*G06F 16/00* (2019.01)
*G06F 16/248* (2019.01)
*G06F 16/22* (2019.01)

(52) U.S. Cl.
CPC ........ *G06F 16/248* (2019.01); *G06F 16/2246* (2019.01)

(58) Field of Classification Search
CPC .......................... G06F 16/2246; G06F 16/248
USPC .................................................. 707/705–780
See application file for complete search history.

(56) References Cited

U.S. PATENT DOCUMENTS

| | | | | |
|---|---|---|---|---|
| 6,105,023 A * | 8/2000 | Callan | .................. | G06F 16/319 |
| 6,988,093 B2 | 1/2006 | Pic et al. | | |
| 7,200,271 B2 | 4/2007 | Boose et al. | | |
| 7,657,515 B1 * | 2/2010 | Jewell | ................. | G06F 16/3332 |
| | | | | 707/999.003 |
| 8,219,579 B2 * | 7/2012 | Ratiner | ................. | G06F 16/332 |
| | | | | 707/769 |
| 8,326,861 B1 * | 12/2012 | Ainslie | ................. | G06F 16/335 |
| | | | | 707/768 |
| 8,572,126 B2 | 10/2013 | Flor et al. | | |
| 8,661,023 B1 | 2/2014 | Chun et al. | | |
| 9,165,068 B2 | 10/2015 | Winter et al. | | |
| 9,208,254 B2 | 12/2015 | Zhang | | |
| 9,348,890 B2 | 5/2016 | Larson | | |
| 9,824,142 B2 * | 11/2017 | Kusumura | ............ | G06F 16/355 |
| 9,836,529 B2 | 12/2017 | Zelevinsky et al. | | |
| 1,007,387 A1 | 9/2018 | Larson | | |

(Continued)

OTHER PUBLICATIONS

International Search Report and Written Opinion for International Patent Application No. PCT/CA2018/050818, dated Oct. 9, 2018, 11 pgs.

(Continued)

*Primary Examiner* — Michelle N Owyang
(74) *Attorney, Agent, or Firm* — Sprinkle IP Law Group

(57) ABSTRACT

Embodiments as disclosed may provide a search operator that addresses the problem of query construction for finding objects that include some number (N) of a set of terms (M). Moreover, embodiments as disclosed herein may efficiently implement the searches specified by such subset operators using a subset process that combines results from a set of term processes where only one term process may be needed for each search term (or search term variant).

18 Claims, 5 Drawing Sheets

(56) References Cited

U.S. PATENT DOCUMENTS

| | | | |
|---|---|---|---|
| 2004/0064447 A1* | 4/2004 | Simske | G06F 16/3338 |
| 2005/0114317 A1* | 5/2005 | Bhide | G06F 16/951 |
| 2007/0011321 A1 | 1/2007 | Huntington | |
| 2007/0106658 A1 | 5/2007 | Ferrari | |
| 2008/0189261 A1* | 8/2008 | Andreev | G06F 16/90324 |
| 2009/0006447 A1 | 1/2009 | Balmin | |
| 2013/0226935 A1 | 8/2013 | Bai et al. | |
| 2014/0163955 A1 | 6/2014 | Ng Tara | |
| 2015/0178286 A1* | 6/2015 | Dhollander | G05B 19/41875 |
| | | | 707/728 |
| 2015/0310115 A1* | 10/2015 | Ryger | G06F 16/93 |
| | | | 707/708 |
| 2017/0011114 A1* | 1/2017 | Naressi | G06F 16/322 |
| 2017/0011046 A1 | 12/2017 | Kapoor et al. | |
| 2017/0371924 A1 | 12/2017 | Ding et al. | |
| 2018/0330009 A1 | 11/2018 | Pidduck et al. | |
| 2019/0272343 A1 | 9/2019 | Pidduck et al. | |

OTHER PUBLICATIONS

International Search Report and Written Opinion issued for International PCT Application No. PCT/IB2019/051253, dated Jun. 11, 2019, 7 pages.

Office Action for U.S. Appl. No. 15/976,603, dated Jan. 29, 2020, 11 pgs.

Office Action for U.S. Appl. No. 15/911,412, dated Mar. 24, 2020, 14 pgs.

* cited by examiner

| ID | | | | | |
|---|---|---|---|---|---|
| 1 | RIVERS | | RAINFALL | | |
| 2 | | | RAINFALL | | STREAM |
| 3 | | | | PONDS | |
| 4 | | | | | |
| 5 | | LAKES | RAINFALL | PONDS | |
| 6 | | | | | |
| 7 | RIVERS | LAKES | | | |
| 8 | | | RAINFALL | | STREAM |
| 9 | | | | | |
| 10 | | | | | |
| 11 | | | | | |
| 12 | | LAKES | | PONDS | |
| 13 | RIVERS | LAKES | | | |
| 14 | | LAKES | | | |
| 15 | RIVERS | LAKES | | | STREAM |
| 16 | | | | | |
| 17 | | | | | |
| 18 | | | | | |
| 19 | RIVERS | | RAINFALL | | |
| 20 | RIVERS | LAKES | | | |
| 21 | | | RAINFALL | PONDS | |
| 22 | | | | | STREAM |
| 23 | | LAKES | RAINFALL | | STREAM |
| 24 | | LAKES | | | |
| 25 | RIVERS | | | PONDS | |
| 26 | | | | | |
| 27 | | | | PONDS | |
| 28 | | | | | |
| 29 | | | | | |
| 30 | RIVERS | LAKES | RAINFALL | | |
| 31 | RIVERS | | | | |
| 32 | | | | | |
| 33 | | | | | STREAM |
| 34 | | | | | |
| END | | | | | |

FIG. 5

| OPERATION | RIVERS | LAKES | RAINFALL | PONDS | STREAM | MATCH ID |
|---|---|---|---|---|---|---|
| STARTING POINT | 0 | 0 | 0 | 0 | 0 | |
| NEXT 0 | 1 | 5 | 1 | 3 | 2 | |
| NEXT 1 | 7 | 5 | 2 | 3 | 2 | |
| NEXT 2 | 7 | 5 | 5 | 3 | 8 | |
| NEXT 3 | 7 | 5 | 5 | 5 | 8 | 5 |
| NEXT 5 | 7 | 7 | 8 | 12 | 8 | |
| NEXT 7 | 13 | 12 | 8 | 12 | 8 | |
| NEXT 8 | 13 | 12 | 19 | 12 | 15 | |
| NEXT 12 | 13 | 13 | 19 | 21 | 15 | |
| NEXT 13 | 15 | 14 | 19 | 21 | 15 | |
| NEXT 14 | 15 | 15 | 19 | 21 | 15 | 15 |
| NEXT 15 | 19 | 20 | 19 | 21 | 22 | |
| NEXT 19 | 20 | 20 | 21 | 21 | 22 | |
| NEXT 20 | 25 | 23 | 21 | 21 | 22 | |
| NEXT 21 | 25 | 23 | 23 | 25 | 22 | |
| NEXT 22 | 25 | 23 | 23 | 25 | 23 | 23 |
| NEXT 23 | 25 | 24 | 30 | 25 | 33 | |
| NEXT 24 | 25 | 30 | 30 | 25 | 33 | |
| NEXT 25 | 30 | 30 | 30 | 27 | 33 | |
| NEXT 27 | 30 | 30 | 30 | END | 33 | 30 |
| NEXT 30 | 31 | END | END | END | 33 | |
| NEXT 31 | END | END | END | END | 33 | |
| NEXT 33 | END | END | END | END | END | |

FIG. 6

SYSTEM AND METHOD FOR SUBSET SEARCHING AND ASSOCIATED SEARCH OPERATORS

CROSS-REFERENCE TO RELATED APPLICATION(S)

This application claims a benefit of priority under 35 U.S.C. 119 to U.S. Provisional Application No. 62/247,324, filed Oct. 28, 2015, entitled "SYSTEM AND METHOD FOR SUBSET SEARCHING AND ASSOCIATED SEARCH OPERATORS," which is hereby incorporated herein for all purposes.

TECHNICAL FIELD

This disclosure relates generally to search engines. More particularly, this disclosure relates to systems and methods for search engines that facilitate specification of complex search queries using simple operators and are capable of efficient implementation of these queries.

BACKGROUND

A search engine is a computer program used to index electronically stored information (referred to as a corpus) and search the indexed electronic information to return electronically stored information responsive to a search. Items of electronic information that form the corpus may be referred to interchangeably as (electronic) documents, files, objects, items, content, etc. and may include objects such as files of almost any type including document for various editing applications, emails, workflows, etc. In a conventional search engine, a user submits a query and the search engine selects a set of results from the corpus based on the terms of the search query. The terms of search queries usually specify words, terms, phrases, logical relationships, metadata fields to be searched, synonyms, stemming variations, etc.

Generally, there are two basic methods for selecting a set of results from a corpus based on a search query. In the first method, an item that meets the explicit search terms of the search query will be selected. Only items of the corpus that meet the explicit requirements of the search terms are selected and presented. In the second method, for some types of applications, the set of results selected is constrained (or further constrained) by a relevance measure. In particular, results selected by evaluating a search query as an explicit query are further scored and ordered by some criteria, and only the highest results are selected. Relevance scoring may incorporate variables such as the frequency of terms, weights on results with certain values or in specified metadata fields, distance from a value or a date, etc.

These types of searches may be employed in various different contexts and for various different purposes, however, in certain contexts one or the other type of search may prove more or less useful or apropos for a certain task. Certain areas have, however, proved difficult to the application of searches of either type. Examples of these areas include searches of a corpus of documents in conjunction with litigation discovery and classification of documents within a corpus generally. Searches for these types of applications typically rely on the second method. The total set of results that meet the search criteria from an explicit term search is often too large, so the second type of search is employed using a threshold that is set with respect to a relevance score generated for each of a set of results. In one example then, search results which meet the search criteria specified and also exceed the threshold relevance score are then returned (e.g., are deemed responsive to the discovery request, classified as the category of interest, etc.).

Although this second method of selecting items from the corpus may be statistically effective, it has certain significant drawbacks. Specifically, it is very hard for a user to understand and predict what a relevance score (e.g., for a particular document) will be. Relevance is usually based on complex mathematical computations, and a user has little chance of being able to predict whether a given item will be scored high enough to be classified as belonging to a category. This situation in turn means that searches which rely on exceeding a relevance threshold are, for example, not easily defensible in court (e.g., in the litigation context), since a user cannot easily explain or predict why a given search result will be classified as belonging to a category or was responsive to a document request, etc.

Thus in certain contexts, to ensure that a result is predictable or defensible, a user may often rely only on the first method, constructing a search query that explicitly selects items responsive to the terms. Accordingly, the implementation of a search according to such search queries by typical search engines may consume large quantities of time, memory or other computer resources. In some cases, for certain queries the resources required for a particular query may exceed the computing resources available or may require that certain computing resources by taken off-line and dedicated to the search in order to complete such a search.

What is needed, therefore, are systems and methods that allow simple specification of searches and that efficiently implement such searches.

SUMMARY

To those ends, among others, embodiments as disclosed may provide a search operator that addresses the problem of complex query construction for finding objects that include some number (N) of a set of terms (M). Moreover, embodiments as disclosed herein may efficiently implement the searches specified by such subset operators using a subset process that combines results from a set of term processes where only one term process may be needed for each search term (or search term variant).

This subset operator may take almost any form desired and be utilized with other operators traditionally used with search queries as are known in the art. The subset operator may utilize almost any syntax desired to specify a search for a number of terms. For example, "Subset ([N], term 1, term 2 . . . term M)" may specify that for that search (or portion of a search) an object is responsive if it contains at least N of the M terms if N is a positive number. If N is a negative number such a search could specify that an object is responsive if it matches at least all but N terms. If N is a percentage (e.g., 20%) such a search could specify that an object is responsive if it matches that percentage (rounded to the nearest lower or higher whole number) of the M terms.

The M terms can be any expressions supported by the search system, which might include words, phrases, regular expressions, ranges, stemming, thesaurus, etc. For simplicity, variations of the subset operator (e.g., different operators) could be used to specify list of terms using stemmed values or other operations. Further extensions could incorporate other common search features, such as proximity. For example, the operator "termset" used in the following syntax might specify exact matches: "termset(3, home, house, "domestic dwelling", "primary residence")". The operator "stemset" used in the following syntax might include variations based on stemming or plurals: stemset (20%, car, truck, motorcycle, van, minivan, pickup, jeep, suv, "sport utility vehicle").

Other variations on operators, syntaxes and uses are imaginable and contemplated herein. For example, while embodiments have generally been presented as finding a minimum of N items in a set of M (e.g., a minimum of five, but objects with six terms would also meet the search criteria), other embodiments may be used to find objects with exactly N of M items (e.g., "exactsubset ([N], term 1, term 2 . . . term M)"). Another embodiment may allow a search operator and corresponding search for objects which do not have N of M terms (or which have at most N−1 of the M terms, etc.). Such a search term may, for example, take the form "not subset (2, pond, lake, river, stream)" or have a separate search operator such as: fewer than (3, pond, lake, river, stream)", etc. Other variations, syntaxes and uses are also possible By implementing such a subset process the N of M search problem may be solved efficiently at the process and search tree level as oppose to at the query level (e.g., by expanding such a query manually). Thus, using such a subset process subset matching may be implemented in a manner that would be cumbersome and difficult to do at a query construction level. Accordingly, embodiments may avoid the need to execute such huge queries and provide many technical improvements in the functioning of the computer when applying such subset searching, including the use of fewer computer resources such as memory or processor cycles and may require less time to execute. Moreover, embodiments of such search operators may be usefully applied in a variety of contexts.

In one embodiment, a search system may include a processor and a data store storing a corpus and an index of the corpus. The corpus comprises a set of objects, each object associated with a corresponding identifier. The search system can receive a search query having a subset operator, the subset operator including a threshold and a set of search terms and generate a search tree for the subset operator. The threshold may be specified, for example, as a number value or a percentage value. The search tree may have a subset operator node including a subset process configured according to the threshold, wherein the subset operator node has, for each search term, a sub-node comprising a term process corresponding to that search term. The search system can execute the search tree using the index to determine one or more objects of the corpus that satisfy the subset operator. Executing the search tree can include receiving a result from each of the term processes at the subset process and evaluating the result from each of the term processes by the subset process to determine if an object has a number of the set of terms equal to or greater than the threshold. The search system or a process executing thereon can also return the identifiers for the one or more objects of the corpus that satisfy the subset operator.

In certain embodiments, each of the term processes is an iterator configured to evaluate the documents of the corpus according to an order of the identifiers of the objects and the result is an identifier of the next object containing the search term associated with the term process according to the order. For example, the identifiers may be numerical and the order of the identifiers may be sequentially from lowest to highest. In other embodiments, almost any reproducible order may be utilized, including an order based on linked lists, non-sequential but monotonic ordering, or other representations or orderings.

In some embodiments, the subset process is configured to call each of the term processes to determine the result for that term process.

In another embodiment, evaluating the result from each of the term processes by the subset process comprises determining if a number of results from each of the term processes with a minimum value is equal to, or exceeds, the threshold and if so, adding the object associated with the identifier to the one or more objects that satisfy the subset operator.

In still another embodiment, the subset process obtains a next result from each term process whose result is the minimum value of all the results returned by the term processes.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 5 is a table illustrating example data.

FIG. 6 is a table illustrating an example use of a subset operator with the data of FIG. 5.

DETAILED DESCRIPTION

Figure 1A:
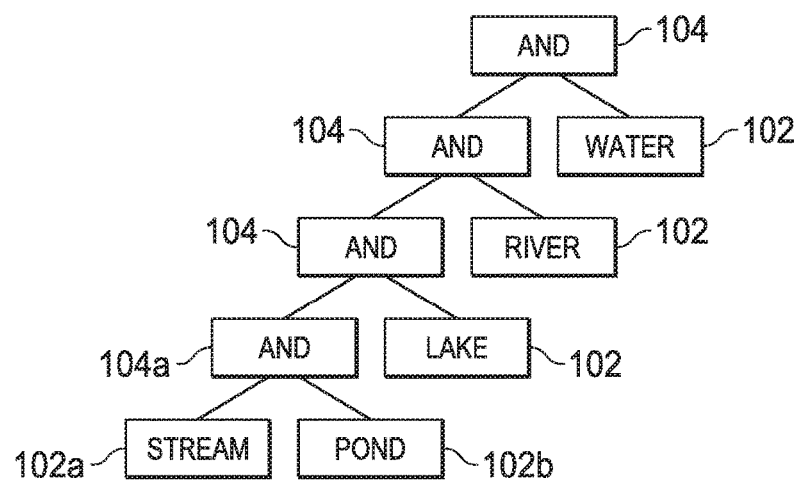
FIGS. 1A and 1B depict example search trees.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Before discussing embodiments in detail, some context may be useful. As discussed, a search engine is a computer program or a set of programs used to index information (referred to as a corpus) and search for indexed information. In a conventional search engine, a user submits a query and the search engine selects a set of results from the corpus based on the terms of the search query. Generally, there are two basic methods for selecting a set of results from a corpus based on a search query. In the first method, an item that meets the explicit search terms of the search query will be selected. Only items of the corpus that meet the explicit requirements of the search terms are selected and presented. In the second method, for some types of applications, the set of results selected is constrained (or further constrained) by a relevance measure. In particular, results selected by evaluating a search query as an explicit query are further scored and ordered by some criteria, and only the highest results are selected. Relevance scoring may incorporate variables such as the frequency of terms, weights on results with certain values or in specified metadata fields, distance from a value or a date, etc.

These types of searches may be employed in various different contexts and for various different purposes, however, in certain contexts one or the other type may prove more or less useful or apropos for a certain task. Certain areas have, however, proved difficult to the application of searches of either type. Examples of these areas include search of a corpus of documents in conjunction with litigation discovery and classification of documents within a corpus generally. Searches for these types of applications typically rely on the second method. The total set of results that meet the search criteria from an explicit term search is often too large, so the second type of search is employed using a threshold that is set with respect to a relevance score generated for each of a set of results. In one example then, search results which meet the search criteria specified and also exceed the threshold relevance score are then returned (e.g., are deemed responsive to the discovery request, classified as the category of interest, etc.).

Although this second method of selecting items from the corpus may be statistically effective, it has certain significant drawbacks. Specifically, it is very hard for a user to understand and predict what a relevance score (e.g., for a particular document) will be. To ensure that a result is predictable and defensible, a user may need to rely only on the first method, constructing a search query that explicitly selects items responsive to the terms. This is a very complex process.

Consider the following example: a document should be Classified as "Watershed" (e.g., responsive to a document request for Watershed documents) if the document contains at least 5 of the following terms:
Water, river, lake, pond, stream, creek, rain, rainfall, dam The second method, using relevance thresholds, might use a simple search query like:
(Water or river or lake or pond or stream or creek or rain or rainfall or dam)

The relevance algorithms can then be relied on to rank results that have more of these terms higher, and through trial and error a relevance threshold can be selected by the searcher that will return what is believed to be a suitable number of documents (e.g., a threshold of 62%). This approach may be difficult to defend, since the relevance algorithm includes many other factors such as word frequency and length of the document. Even after experimentation, there will be results with fewer than five terms that match, or five or more terms that fail to match due to the other considerations that factor into relevance. Moreover, in a litigation context it may be the party that owns the documents to be disclosed that is performing the searching. As many times this party does not want to turn over documents at all, such a search may be even more opaque to the other party who wishes to find such documents and have them produced.

To get a defensible solution (e.g., to a judge or opposing counsel), there may be a need to construct an explicit search query to find five or more of these terms, which is extremely difficult for a typical user to construct.

Using traditional unary and binary operators the unreduced example query might look like this:
SELECT . . . WHERE (stream AND pond AND lake AND river AND water) OR
(creek AND pond AND lake AND river AND water) OR
(creek AND stream AND lake AND river AND water) OR
(creek AND stream AND pond AND river AND water) OR
(creek AND stream AND pond AND lake AND water) OR
(creek AND stream AND pond AND lake AND river) OR
(rain AND pond AND lake AND river AND water) OR
(rain AND stream AND lake AND river AND water) OR
(rain AND stream AND pond AND river AND water) OR
(rain AND stream AND pond AND lake AND water) OR
(rain AND stream AND pond AND lake AND river) OR
(rain AND creek AND lake AND river AND water) OR
(rain AND creek AND pond AND river AND water) OR
(rain AND creek AND pond AND lake AND water) OR
(rain AND creek AND pond AND lake AND river) OR
(rain AND creek AND stream AND river AND water) OR
(rain AND creek AND stream AND lake AND water) OR
(rain AND creek AND stream AND lake AND river) OR
(rain AND creek AND stream AND pond AND water) OR
(rain AND creek AND stream AND pond AND river) OR
(rain AND creek AND stream AND pond AND lake) OR
(rainfall AND pond AND lake AND river AND water) OR
(rainfall AND stream AND lake AND river AND water) OR
(rainfall AND stream AND pond AND river AND water) OR
(rainfall AND stream AND pond AND lake AND water) OR
(rainfall AND stream AND pond AND lake AND river) OR
(rainfall AND creek AND lake AND river AND water) OR (rainfall AND creek AND pond AND river AND water) OR
(rainfall AND creek AND pond AND lake AND water) OR
(rainfall AND creek AND pond AND lake AND river) OR
(rainfall AND creek AND stream AND river AND water) OR
(rainfall AND creek AND stream AND lake AND water) OR
(rainfall AND creek AND stream AND lake AND river) OR
(rainfall AND creek AND stream AND pond AND water) OR
(rainfall AND creek AND stream AND pond AND river) OR
(rainfall AND creek AND stream AND pond AND lake) OR
(rainfall AND rain AND lake AND river AND water) OR
(rainfall AND rain AND pond AND river AND water) OR
(rainfall AND rain AND pond AND lake AND water) OR
(rainfall AND rain AND pond AND lake AND river) OR
(rainfall AND rain AND stream AND river AND water) OR
(rainfall AND rain AND stream AND lake AND water) OR
(rainfall AND rain AND stream AND lake AND river) OR
(rainfall AND rain AND stream AND pond AND water) OR
(rainfall AND rain AND stream AND pond AND river) OR
(rainfall AND rain AND stream AND pond AND lake) OR
(rainfall AND rain AND creek AND river AND water) OR
(rainfall AND rain AND creek AND lake AND water) OR
(rainfall AND rain AND creek AND lake AND river) OR
(rainfall AND rain AND creek AND pond AND water) OR
(rainfall AND rain AND creek AND pond AND river) OR
(rainfall AND rain AND creek AND pond AND lake) OR
(rainfall AND rain AND creek AND stream AND water) OR
(rainfall AND rain AND creek AND stream AND river) OR
(rainfall AND rain AND creek AND stream AND lake) OR
(rainfall AND rain AND creek AND stream AND pond) OR
(dam AND pond AND lake AND river AND water) OR
(dam AND stream AND lake AND river AND water) OR
(dam AND stream AND pond AND river AND water) OR
(dam AND stream AND pond AND lake AND water) OR
(dam AND stream AND pond AND lake AND river) OR
(dam AND creek AND lake AND river AND water) OR
(dam AND creek AND pond AND river AND water) OR
(dam AND creek AND pond AND lake AND water) OR
(dam AND creek AND pond AND lake AND river) OR
(dam AND creek AND stream AND river AND water) OR
(dam AND creek AND stream AND lake AND water) OR
(dam AND creek AND stream AND lake AND river) OR
(dam AND creek AND stream AND pond AND water) OR
(dam AND creek AND stream AND pond AND river) OR
(dam AND creek AND stream AND pond AND lake) OR
(dam AND rain AND lake AND river AND water) OR
(dam AND rain AND pond AND river AND water) OR
(dam AND rain AND pond AND lake AND water) OR
(dam AND rain AND pond AND lake AND river) OR
(dam AND rain AND stream AND river AND water) OR
(dam AND rain AND stream AND lake AND water) OR
(dam AND rain AND stream AND lake AND river) OR
(dam AND rain AND stream AND pond AND water) OR
(dam AND rain AND stream AND pond AND river) OR
(dam AND rain AND stream AND pond AND lake) OR
(dam AND rain AND creek AND river AND water) OR
(dam AND rain AND creek AND lake AND water) OR
(dam AND rain AND creek AND lake AND river) OR
(dam AND rain AND creek AND pond AND water) OR
(dam AND rain AND creek AND pond AND river) OR
(dam AND rain AND creek AND pond AND lake) OR
(dam AND rain AND creek AND stream AND water) OR
(dam AND rain AND creek AND stream AND river) OR
(dam AND rain AND creek AND stream AND lake) OR
(dam AND rain AND creek AND stream AND pond) OR
(dam AND rainfall AND lake AND river AND water) OR
(dam AND rainfall AND pond AND river AND water) OR
(dam AND rainfall AND pond AND lake AND water) OR
(dam AND rainfall AND pond AND lake AND river) OR
(dam AND rainfall AND stream AND river AND water) OR
(dam AND rainfall AND stream AND lake AND water) OR
(dam AND rainfall AND stream AND lake AND river) OR
(dam AND rainfall AND stream AND pond AND water) OR
(dam AND rainfall AND stream AND pond AND river) OR
(dam AND rainfall AND stream AND pond AND lake) OR
(dam AND rainfall AND creek AND river AND water) OR
(dam AND rainfall AND creek AND lake AND water) OR
(dam AND rainfall AND creek AND lake AND river) OR
(dam AND rainfall AND creek AND pond AND water) OR
(dam AND rainfall AND creek AND pond AND river) OR
(dam AND rainfall AND creek AND pond AND lake) OR
(dam AND rainfall AND creek AND stream AND water) OR
(dam AND rainfall AND creek AND stream AND river) OR
(dam AND rainfall AND creek AND stream AND lake) OR
(dam AND rainfall AND creek AND stream AND pond) OR
(dam AND rainfall AND rain AND river AND water) OR
(dam AND rainfall AND rain AND lake AND water) OR
(dam AND rainfall AND rain AND lake AND river) OR
(dam AND rainfall AND rain AND pond AND water) OR
(dam AND rainfall AND rain AND pond AND river) OR
(dam AND rainfall AND rain AND pond AND lake) OR
(dam AND rainfall AND rain AND stream AND water) OR
(dam AND rainfall AND rain AND stream AND river) OR
(dam AND rainfall AND rain AND stream AND lake) OR
(dam AND rainfall AND rain AND stream AND pond) OR
(dam AND rainfall AND rain AND creek AND water) OR
(dam AND rainfall AND rain AND creek AND river) OR
(dam AND rainfall AND rain AND creek AND lake) OR
(dam AND rainfall AND rain AND creek AND pond) OR (dam AND rainfall AND rain AND creek AND stream)

The above query contains 629 binary operators and 630 term operators. In certain cases, it may be possible to optimize the query to the following query:

SELECT . . . WHERE (water AND river AND lake AND pond AND (stream OR creek OR rain OR rainfall OR dam)) OR
(water AND river AND lake AND stream AND (creek OR rain OR rainfall OR dam)) OR
(water AND river AND lake AND creek AND (rain OR rainfall OR dam)) OR
(water AND river AND lake AND rain AND (rainfall OR dam)) OR
(water AND river AND lake AND rainfall AND dam) OR
(water AND lake AND pond AND stream AND (creek OR rain OR rainfall OR dam)) OR
(water AND lake AND pond AND creek AND (rain OR rainfall OR dam)) OR
(water AND lake AND pond AND rain AND (rainfall OR dam)) OR
(water AND lake AND pond AND rainfall AND dam) OR
(water AND pond AND stream AND creek AND (rain OR rainfall OR dam)) OR
(water AND pond AND stream AND rain AND (rainfall OR dam)) OR
(water AND pond AND stream AND rain AND dam) OR
(water AND stream AND creek AND rain AND (rainfall OR dam)) OR
(water AND stream AND creek AND rainfall AND dam) OR
(water AND creek AND rain AND rainfall AND dam) OR
(river AND lake AND pond AND stream AND (creek OR rain OR rainfall OR dam)) OR
(river AND lake AND pond AND creek AND (rain OR rainfall OR dam)) OR
(river AND lake AND pond AND rain AND (rainfall OR dam)) OR
(river AND lake AND pond AND rain AND dam) OR
(river AND pond AND stream AND creek AND (rain OR rainfall OR dam)) OR
(river AND pond AND stream AND rain AND (rainfall OR dam)) OR
(river AND pond AND stream AND rainfall AND dam) OR
(river AND stream AND creek AND rain AND (rainfall OR dam)) OR
(river AND stream AND creek AND rainfall AND dam) OR
(river AND creek AND rain AND rainfall AND dam)) OR
(lake AND pond AND stream AND creek AND (rain OR rainfall OR dam)) OR
(lake AND pond AND stream AND rain AND (rainfall OR dam)) OR
(lake AND pond AND stream AND rainfall AND dam) OR
(lake AND stream AND creek AND rain AND (rainfall OR dam)) OR
(lake AND stream AND creek AND rainfall AND dam) OR
(lake AND creek AND rain AND rainfall AND dam)) OR
(pond AND stream AND creek AND rain AND (rainfall OR dam)) OR
(pond AND stream AND creek AND rainfall AND dam) OR
(stream AND creek AND rain AND rainfall AND dam)

However, even in this case such a search may still use 205 term iterators and 205 binary iterators. In practice, a search query may have many other criteria (dates, metadata values, other text terms, etc.) As one can imagine, creating search queries for more complex scenarios will quickly exceed a (searching) user's capacity to easily and correctly build a search query. This problem arises in no small part because in a binary tree approach to implementing a search, each binary operator of the search tree may be a node that includes two sub-nodes, where each of these sub-nodes may be either another operator node or may include a search term node (e.g., as a leaf node). Thus, traditional search engines construct search trees made up of unary or binary iterators in the tree and term iterators at the leaves of the tree. Each term iterator scope is limited to one term and each binary operator process is limited to two terms. Such constraints lead to extremely complex queries, even for a small number of terms.

Accordingly, the implementation of such search queries by typical search engines may consume large quantities of time, memory or other computer resources. In some cases, for certain queries, the resources required for a particular query may exceed the computing resources available or may require that certain computing resources by taken off-line and dedicated to the search in order to complete such a search. At least in part this situation may result from the manner in which these types of searches are implemented by typical search engines. As mentioned, most search engines function by evaluating a search using a binary tree approach where binary search operators are involved. To illustrate in more detail, almost all search engines (e.g., full text search engines) maintain an index. This index may include, for example, an inverted copy of the indexed information. So, for example, assume that the corpus of documents being indexed includes three documents with the following values in a "Name" field:

Object 1—"Water, Rivers and Lakes"
Object 2—"Rivers, Dams and Rainfall"
Object 3—"Rivers and Ponds"

For the above example an inverted index (also called the posting list) for the "Name" field may look similar to:

And—1, 2, 3
Rivers—1, 2, 3
Lakes—1
Rainfall—2
Ponds—3
Water—1
Dams—2

Such an index indicates that the term "And" appears in objects 1, 2 and 3, the term "rivers" appears in objects 1, 2 and 3, the term "lakes" appears in object 1, the term "Ponds" appears in object 3, etc.

FIG. 1A depicts a representation of an example search tree for the search "(stream AND pond AND lake AND river AND water)". Here, each term node 102 represents a process that searches, determines and provides objects of the corpus that includes the labeled term. In other words, a process may access the index to determine which objects of the corpus include that search term. For example, term node 102a represents access to the index to identify objects that include the term "stream". Similarly, term node 102b represents access to the index to identify objects that include the term "pond." Operator node 104a represents that a process will union or otherwise combine the objects returned by the process associated with term node 102a and the process associated with term node 102b to determine the objects that contain both the term "stream" and the search term "pond". As can be seen, the search "(stream AND pond AND lake AND river AND water)" requires at least five term processes 102 for the search terms and four binary operator processes 104 for each of the operator.

Figure 1B:
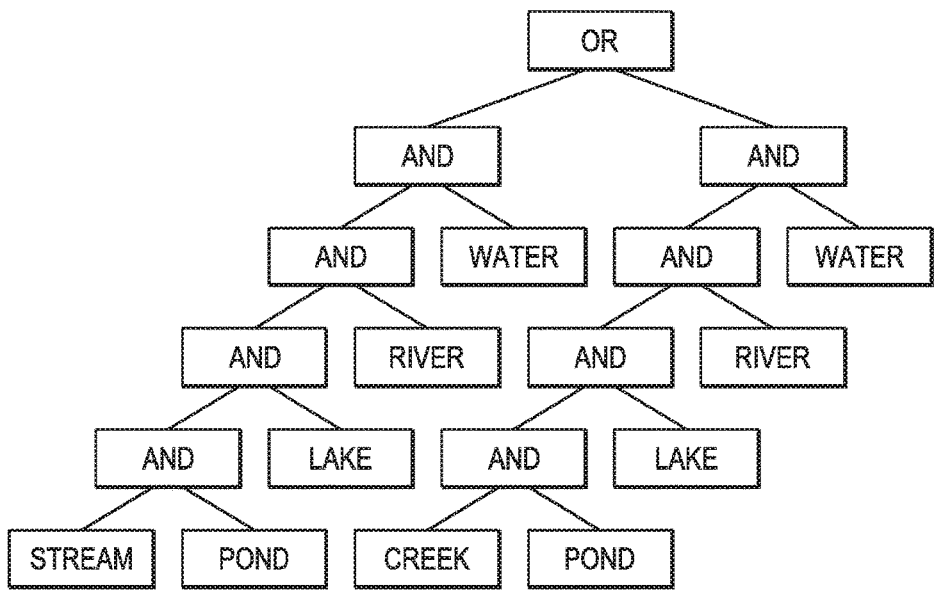
Figure 1C:
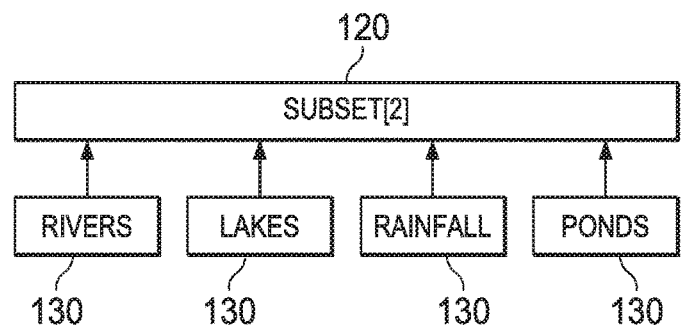
FIG. 1C depicts one example of a search tree for an example use of a subset operator

As can be imagined from the depiction of this simple search, the associated number of processes, associated computer power, memory, time, etc., quickly become untenable when discussing search queries like those enumerated above. To illustrate further, FIG. 1B is a block diagram depicting a representation of an example search tree for the search "(stream AND pond AND lake AND river AND water) OR (creek AND pond AND lake AND river AND water)". As can be seen, the search tree may grow exponentially based on the number of operators or permutations involved in the search, despite that the number of actual terms involved (e.g., water, river, lake, pond, stream, creek, rain, rainfall, dam) may be constant and relatively few in number.

What is needed, therefore, are systems and methods that allow simple specification of searches to find a set of matching terms and that efficiently implement such searches. To that end, attention is now directed to embodiments of the search operators and their implementations as disclosed herein. Specifically, embodiments as disclosed may provide a search operator (referred to generally as a subset operator) that may address the problem of complex query construction, among other problems, for finding objects that include some number (N) of a set or terms (M). Moreover, embodiments as disclosed herein may efficiently implement the searches specified by such subset operators using a subset process that may combine results from a set of term processes where only one term process may be needed for each search term (or search term variant).

Such subset operators may, for example, take the form of Subset ([N], term 1, term 2 . . . term M). Thus, a representation of the above example query may be "subset (5, water, river, lake, pond, stream, creek, rain, rainfall, dam)." In other words, find any objects that contain at least five of the terms: water, river, lake, pond, stream, creek, rain, rainfall, dam. A subset process may combine results from multiple term processes. Specifically, in most cases the subset process will utilize order M term processes for M search terms and combine the results from these term processes to return objects that have N of those M terms. For example, FIG. 10 depicts an example search tree for the search "subset(2, rivers, lakes, rainfall, ponds)". Here, there is one operator process 120 (the subset process) and four term processes 130, one for each term.

By implementing such a subset process, the N of M search problem may be solved efficiently at the process and search tree level as opposed to at the query level (e.g., by expanding or constructing such a query manually). Thus, using such a subset process subset matching may be implemented in a manner that would be impossible to do at a query construction level. For example, matching five of nine terms using the subset process yields a search tree with a mere ten processes (one subset process and nine term processes). Using conventional methods the same query would use over 1200 iterators (un-optimized) or over 400 iterators (optimized).

Accordingly, embodiments may avoid the need to execute such huge queries and provide many technical improvements in the functioning of the computer when applying such subset searching, including the use of fewer computer resources such as memory or processor cycles and may require less time to execute. Moreover, embodiments of such search operators may be usefully applied in a variety of contexts such as litigation discovery, classification of documents in a corpus, the search exemplars including the location of "like" or similar documents (e.g., based on the content of a reference document or set of reference documents), etc.

Figure 2:
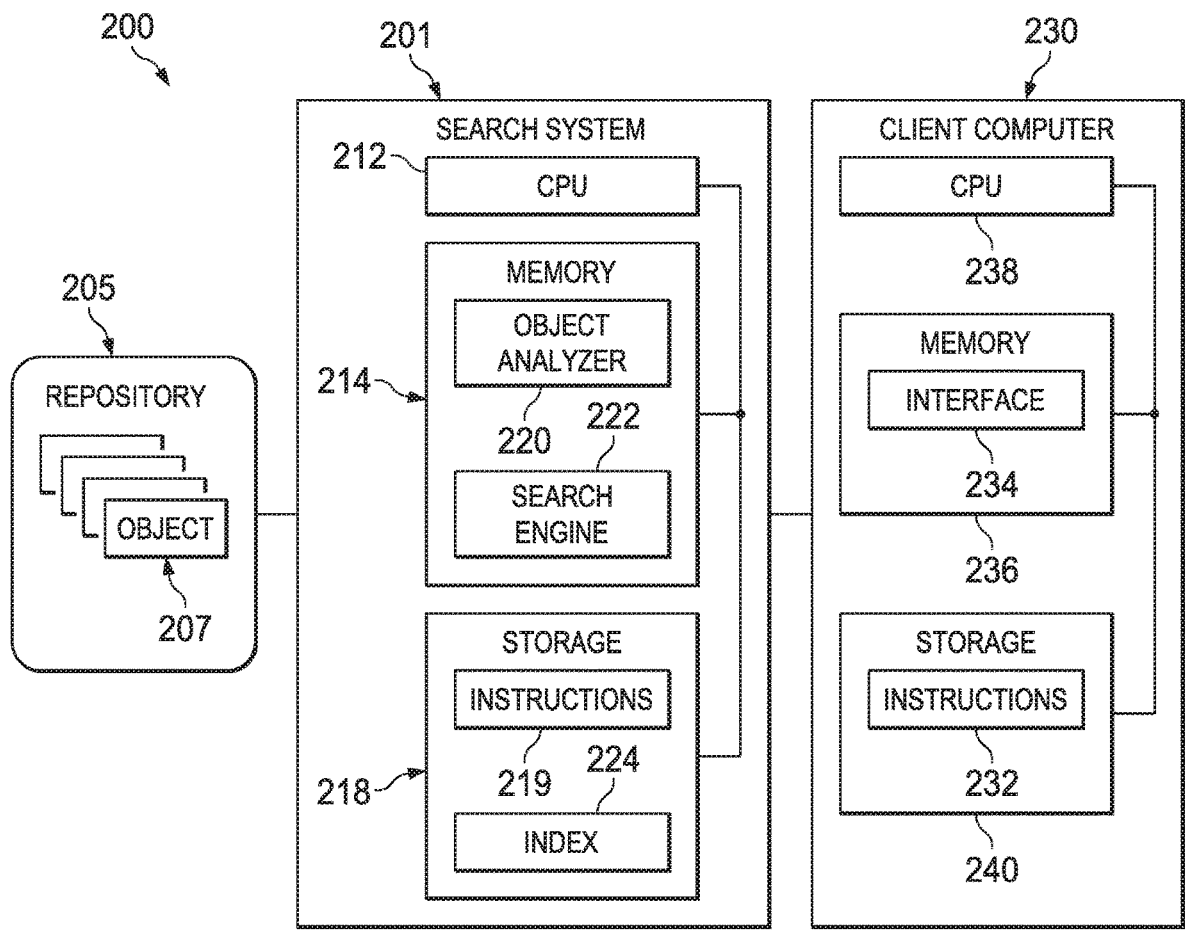
FIG. 2 depicts one embodiment of an architecture including a search system.

Before describing embodiments in detail, it may be helpful to discuss an example of a search system. FIG. 2 depicts a block diagram illustrating an example of computing environment 200 having object repository 205, search system 201, and client computer 230. Object repository 205 may comprise a file server or database system or other storage mechanism remotely or locally accessible by search system 201. Object repository 205 may store objects 207 (e.g., documents, images, emails or other objects) that may be searchable by search system 201.

In the embodiment of FIG. 2, search system 201 comprises a server having central processing unit 212 connected to memory 214 and storage unit 218 via a bus. Central processing unit 212 may represent a single processor, multiple processors, a processor(s) with multiple processing cores and the like. Storage unit 218 may include a non-transitory storage medium such as hard disk drives, flash memory devices, optical media and the like. Search system 201 may be connected to a data communications network.

Storage unit 218 stores computer executable instructions 219 and index 224. Computer executable instructions 219 can represent multiple programs or operating system code. In one embodiment, instructions 219 are executable to provide object analyzer 220 and search engine 222. Object analyzer 220 and search engine 222 may be portions of the same program or may be separate programs. According to one embodiment, for example, object analyzer 220 is a component of a document management system while search engine 222 is a separate program that interfaces with the document management system. Furthermore, object analyzer 220 and search engine 222 can be implemented on different computing systems and can, themselves, be distributed.

Index 224 may include metadata used to identify objects in response to a search query and may also include text used to identify objects. Specifically, as discussed above the index 224 may include an inverted copy of the indexed object. An inverted index may therefore contain a set of terms along with the an identification of which objects contain those terms Index 224 can include a single index containing metadata and text, separate metadata and text indexes or other arrangements of information. While shown as a single index, index 224 may include multiple indices.

Client computer system 230 may include components similar to those of the server of search system 201, such as CPU 238, memory 236, and storage 240. Additionally, client computer system 230 may include executable instructions 232 to provide user interface 234 that allows a user to enter a search query. These instructions 232 may have, for example, be provided by search system 201 in response to an access by client computer 230. User interface 234 may be provided through a web browser, file system interface or other program.

Those skilled in the art will appreciate that search system 201 shown in FIG. 2 is merely an example of a computing system and embodiments of a search system that may be implemented using other computing systems (e.g., desktop computers, laptops, mobile computing devices or other computing devices with adequate processing and memory) including multiple computers acting together to provide a search system (e.g., a cluster of servers or other computing devices connected by a network acting together to provide the search system). Similarly, client computer 230 may include any suitable desktop computer, laptop, mobile device, server or other computing system.

In operation, object analyzer 220 may analyze objects in object repository 205 to determine information to be indexed in index 224. When an object 207 is added to search system 201, two types of information are generally indexed, one or both full text and metadata. As an example, suppose object 207 being added to search system 201 is a text file, the text or content of the file is indexed as well as information about the file. In some cases, the metadata itself may include important information associated with the object 207. This metadata may need its own descriptive metadata indicating attributes of the metadata. In some cases, the metadata on its own without full text content is sufficient to represent an object. Object analyzer 220 can send indexing instructions to search engine 222 to direct search engine 222 to add, modify, or delete metadata or text in index 224.

Object analyzer 220 may be a portion of a larger program, such as a document management program, may be a separate program or may be implemented according any suitable programming architecture. In one embodiment, the process of determining metadata and text to be indexed may be carried out by any number of different programs on a computer system or distributed across computer systems. Detailed discussions concerning an example of an object analyzer can be found in U.S. patent application Ser. No. 13/595,570, filed Aug. 27, 2012, entitled "SYSTEM AND METHOD OF SEARCH INDEXES USING KEY-VALUE ATTRIBUTES TO SEARCHABLE METADATA," which is fully incorporated by reference herein.

When a search query is received at search system 201, search engine 222 can search the information in index 224 to identify objects (content) 207 responsive to the search query and return a list or other representation of those objects 207 to client computer 230.

Figure 3:
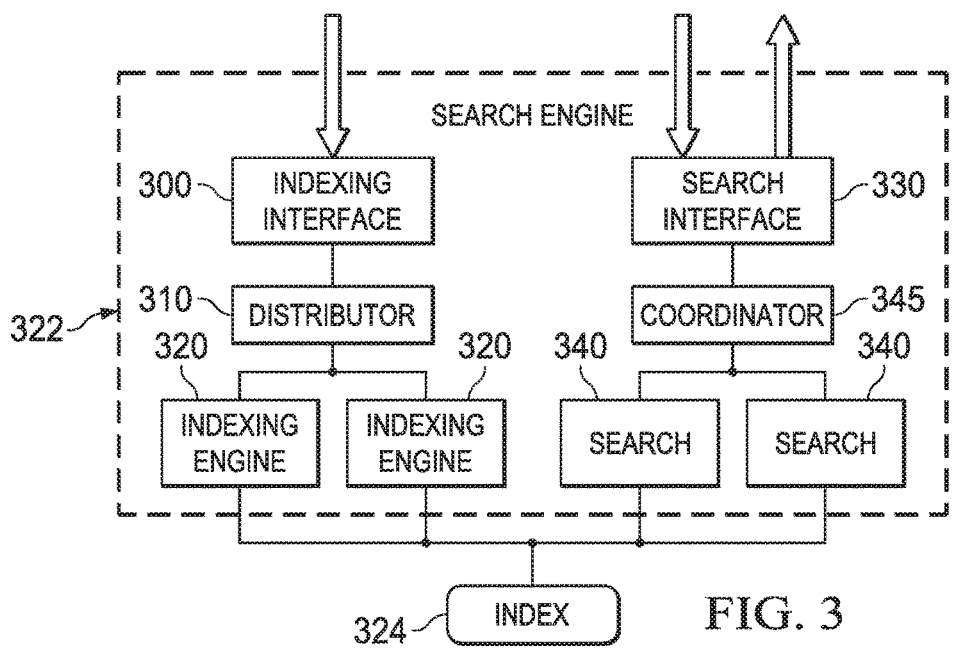
FIG. 3 depicts one embodiment of a search system.

An embodiment of a search engine will now be described with reference to FIG. 3. Specifically, FIG. 3 depicts a diagrammatic representation of logical blocks for one embodiment of search engine 322. Search engine 322 may provide indexing interface 300 that receives indexing requests (e.g., from object analyzer 220) or other source. A distributor module distributor 310 may distribute the indexing requests to indexing engines 320 that act on the indexing requests to update index 324. Search engine 322 may also include search interface 330 to receive queries (e.g., from a user, a content server or other source). Search interface 330 may receive queries and provide the query to a coordinator 345. Coordinator 345 may determine search modules (processes) 340 to instantiate based on the terms of the received query and instantiate those search modules 340. For example, coordinator 345 may define the search module 340 and a hierarchy in order to define a search tree of the search modules 340 corresponding to the received query. The coordinator 345 may then instantiate search modules 340 and provide each module 340 with the data (e.g., related sub modules 340, search term for the search module 340, etc.) needed to process the search tree. The coordinator 345 may then obtain results from one or more of the search modules 340 (e.g., the search module 340 that is a root node of the search tree) and generate a response to the query received through search interface 330. This response may identify one or more responsive objects. Search modules 340 are responsible for implementing a term process for one or more terms using index 324 or implementing an operator process for a search operator. Thus, a search tree may include a set of hierarchically arranged search modules 340 as nodes of the search tree, each search module 340 being a term process or an operator process.

FIG. 3 is provided by way of example. Search engine 322 may include any number of other modules or configurations to update and search index 324. For example, search modules 340 and indexing engines 320 may be a single module. Search engine 322 may be a portion of a larger program, such as a document management program, may be a separate program or may be implemented according to any suitable programming architecture. Furthermore, the processes of search engine 322 may be distributed across multiple computer systems. Additionally, while in FIG. 3, index 324 is illustrated as a single index, index 324 may comprise a set of smaller indexes. For example, a separate index can be used or updated by each indexing engine In one embodiment, a search module 340 may be implemented as an iterator. An iterator may be a process that returns a next object of the type of object for which the iterator is configured. Thus, an iterator may provide an interface or call (e.g., collectively referred to as a "next interface") to allow a requestor (e.g., another search module 340 higher in the search tree or the coordinator) to access the interface of that iterator and obtain the next object of the corpus that is responsive to the configuration of that iterator. For example, a search term iterator for a term may provide a next interface that provides the next object in the corpus that contains that search term. An operator iterator may provide a next interface that provides the next object in the corpus that meets the logical condition(s) specified by that operator with respect to the search terms associated with that operator. An iterator may maintain a pointer or other indicator that maintains an identifier of the iterator's current position in the corpus such that it is the next responsive object in the corpus that is returned with each next call or a null indication if the iterator has reached the end of the corpus without identifying a subsequent document responsive to the configuration of that iterator.

In one embodiment then, search interface 330 may allow a user to use a subset operator in a search query. This subset operator may take almost any form desired and be utilized with other operators traditionally used with search queries as are known in the art. The subset operator may utilize almost any syntax desired to specify a search for a number of terms. For example, "Subset ([N], term 1, term 2 . . . term M)" may specify that for that search (or portion of a search) an object is responsive if it contains at least N of the M terms if N is a positive number. If N is a negative number such a search could specify that an object is responsive if it matches at least all but N terms. If N is a percentage (e.g., 20%) such a search could specify that an object is responsive is it matches that percentage (rounded to the nearest lower or higher whole number) of the M terms.

The M terms can be any expressions supported by the search system, which might include words, phrases, regular expressions, ranges, stemming, thesaurus, etc. For simplicity, variations of the subset operator (e.g., different operators) could be used to specify a list of terms using stemmed values or other operations. Further extensions could incorporate other common search features, such as proximity. For example, the operator "termset" used in the following syntax might specify exact matches: "termset(3, home, house, "domestic dwelling", "primary residence")". The operator "stemset" used in the following syntax might include variations based on stemming or plurals: stemset (20%, car, truck, motorcycle, van, minivan, pickup, jeep, suv, "sport utility vehicle").

Other variations on operators, syntaxes and uses are imaginable and contemplated herein. For example, while embodiments have generally been presented as finding a minimum of N items in a set of M (e.g., a minimum of five, but objects with six terms would also meet the search criteria), other embodiments may be used to find objects with exactly N of M items (e.g., "exactsubset ([N], term 1, term 2 . . . term M)"). Another embodiment may allow a search operator and corresponding search for objects which do not have N of M terms (or which have at most N−1 of the M terms, etc.). Such a search term may, for example, take the form "not subset (2, pond, lake, river, stream)" or have a separate search operator such as: fewer than (3, pond, lake, river, stream)", etc. Other variations, syntaxes and uses are also possible.

If such a subset operator is specified in a received search query, coordinator 345 may instantiate a search module 340 corresponding to the subset operator as a node in the search tree and a set of search modules 340 based on the terms of the received query. For example, coordinator 345 may define the search module 340 and a hierarchy in order to define a search tree of the search modules 340 corresponding to the received query (or the portion of thereof corresponding to the subset operator). The portion of the search tree defined by the coordinator 345 may include a subset operator search module 340 as a node in the search tree where that subset operator search module 340 has a term search module 340 as a sub-node for each term associated with the subset operator in the search query.

To illustrate an example, referring briefly back to FIG. 10, a search tree for the query "subset(2, rivers, lakes, rainfall, ponds)" is depicted. Here, operator process 120 may be a subset operator instantiated by search module 340 and each term processes 130 may be a term search module 340 that is a sub-node of the subset operator search module 340 (e.g., implementing operator process 120).

Returning to FIG. 3, in one embodiment, a subset operator search module 340 may be implemented as an iterator. As used in a search tree such a subset iterator may have a number of sub-nodes, each sub-node corresponding to a term iterator for one of the (M) search terms associated with the subset operator in the original query. The subset iterator may have a threshold value (N) corresponding to the original query such that the subset iterator will return an object (or identifier thereof) in response to a call to the next interface of the subset iterator if the object includes N or more of the M terms based on the objects (or identifiers thereof) returned by the sub-node term iterators.

Figure 4:
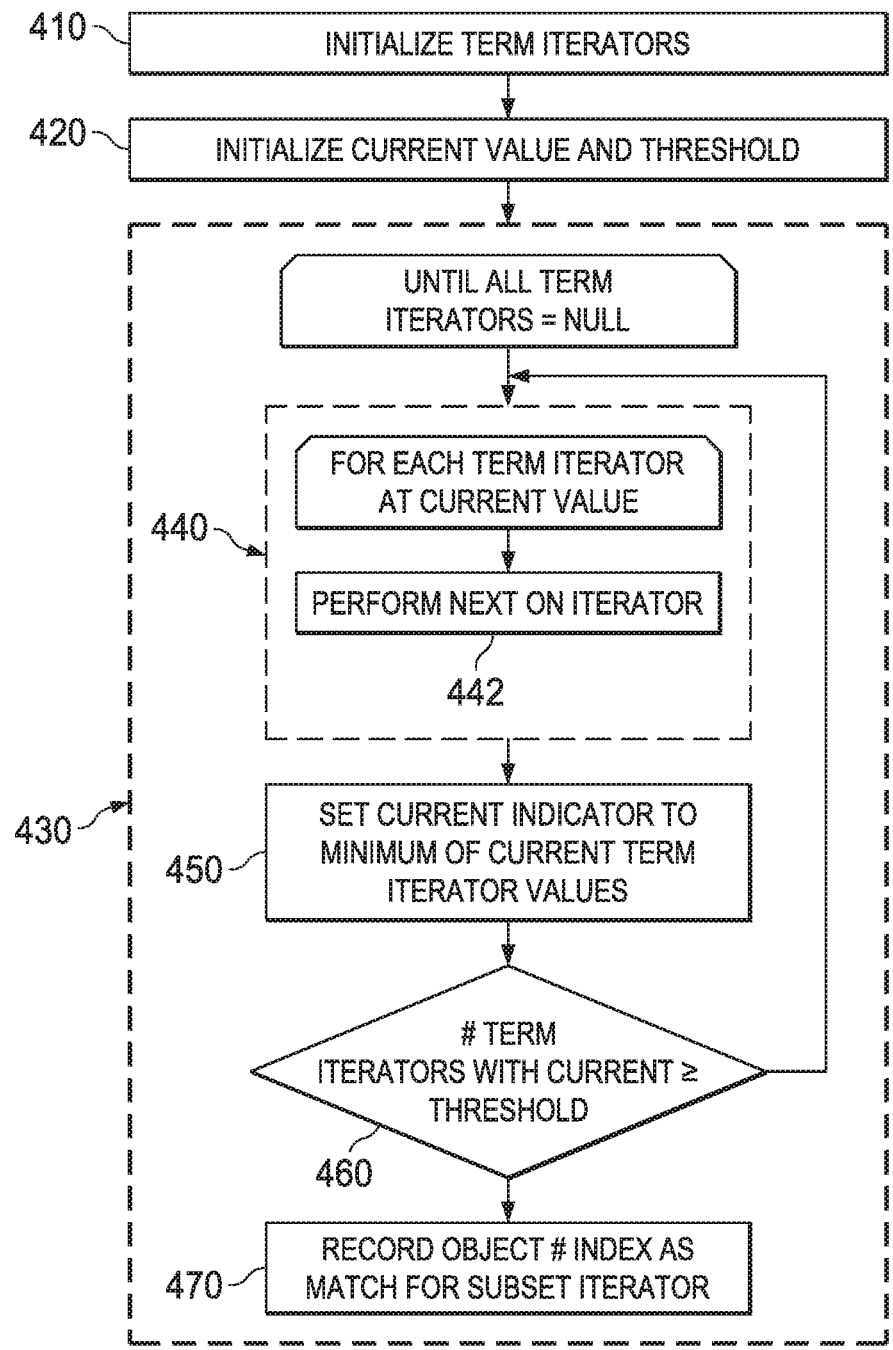
FIG. 4 is a flow diagram depicting one embodiment of a method for a subset iterator.

Referring now to FIG. 4, one embodiment of a method for a subset iterator is depicted. For purposes of explanation with respect to this embodiment it will be noted that a subset iterator employing the method of this embodiment will have some number (M) of sub-nodes, each sub-node including a term iterator. Each term iterator has access to an index of a corpus of objects where each object is associated with an identifier. The identifiers of the objects are sequential and the term iterator maintains an indicator of a current object (which may be initialized) and returns the next document in the sequence (e.g., the next document including the term with a higher identifier than the current indicator, assuming the identifiers are increasing in value) in response to a call to the term iterator's next interface if such an object exists, and an indicator that no more data remains otherwise (e.g., NULL, end, EOF, a particular count, a value storing the last offset, simply running out of data, etc.). For purposes of illustration with this embodiment it will be assumed objects have sequential numerical identifiers greater than zero.

At step 410, the term iterators that are sub-nodes of the subset iterator may be initialized by setting the current object indicator of each of the term iterators to zero. Additionally or alternatively at step 410, a current object indicator for each term iterator may be tracked or maintained by the subset iterator and this current object indicator maintained by the subset iterator may be initialized to zero. Similarly, at step 420 the current indicator of the subset iterator may also be set to zero. Additionally, at step 420 a threshold number of terms may be set for the subset iterator. This threshold may be equal to the number of terms (N) designated for the subset operator in an original query containing the corresponding subset operator.

Loop 430 may be performed until each of the term iterators (or greater than M minus N iterators) return NULL in response to a call to their next interfaces. In loop 440, a call is made to the next interface of each of the sub-node term iterators whose current value is equal to the current value of the subset iterator at step 442. This call will serve to return, for each of the term iterators, an identifier for the next object that contains the term associated with that iterator. The current object indicator for the respective term iterators can then be updated with the values returned from the respective next call to that term iterator. The current indicator of the subset iterator may then be set to the minimum (e.g., smallest) identifier of all the current object indicators for all of the term iterators at step 450.

At step 460, it can then be determined if a number of current object indicators for the term iterators that are equal to the current indicator for the subset iterator (if any) is equal to or greater than the threshold (N) configured for the subset iterator. If the number of current indicators for the term iterators that are equal to the current indicator for the subset iterator is equal to or greater than the threshold at step 460 the object associated with the value of the current subset indicator (e.g., where the current subset indicator is an identifier for that object) may be identified as responsive to the original query (or portion of query). This current subset indicator (e.g., identifier) may then be recorded as an identifier of a matching object at step 470. This identifier can also be returned (e.g., in response to a next call to the subset iterator). Loop 430 can then proceed by returning to loop 440. Alternatively, the subset iterator may halt or otherwise suspend until another next call is received, at which point loop 430 can then proceed by returning to loop 440.

Expressed in pseudocode, embodiments of a method for a subset iterator such as that discussed that operate according to a loop that identifies all objects matching a subset operator in search may be:

```
/*********************/
SubsetIterator(threshold) {
Set all iterator values to 0
LOW=0
    {
        UNTIL each iterator >= end
        For each iterator with value of LOW {
            Advance iterator to NEXT value
        }
        LOW = minimum of the iterator values
        IF number of iterators with value of LOW >= threshold {
            RECORD MATCH for value LOW
        }
    }
}
/*********************/
```

Embodiments of a method for a subset iterator such as that discussed that operate to identify the next object matching a subset operator in a search as expressed in pseudocode may be:

```
MAIN {
    Set all iterator values to 0
    LOW=0
    UNTIL done
        Call GET_NEXT_MATCH
        If response is not done, record value LOW as a match
}
Function GET_NEXT_MATCH {
    UNTIL each iterator >= end
        For each iterator with value of LOW {
            Advance iterator to NEXT value
        }
        LOW = minimum of the iterator values
        IF number of iterators with value of LOW >= threshold {
            RETURN value LOW
        }
    }
    Return done
}
```

It will be helpful to an understanding of certain embodiments to illustrate an embodiment with respect to a specific example. Referring now to FIG. 5, a table representing an inverted index of an example corpus of 34 objects with object identifiers (ID) 1-34. This table provides a representation of the inverted index for five words in a data set: rivers, lakes, rainfall, ponds, stream. The column on the left, labeled "ID", is the unique identifier for the object. Reading across the table, Object 1 contains the words "rivers" and "rainfall". Object 2 contains the words "rainfall" and "stream", etc.

Reading down the columns from top to bottom is a representation of the inverted index for a word. For example, the word "rivers" is contained in objects 1, 7, 13, 15, 19, 20, 25, 30 and 31. In one embodiment, an iterator proceeds sequentially in numerical order from lowest to highest. Thus, for example, a first next call to a term iterator for rivers would (for this corpus) return identifier 1 (e.g., the current indicator value for the rivers term iterator would be 1), a second next call to the term iterator for rivers would return 7 (e.g., the current indicator value for the rivers term iterator would be 7), a third next call would return 13 (e.g., the current indicator value for the rivers term iterator would be 13), etc. In other embodiments, almost any reproducible order may be utilized, including an order based on linked lists, non-sequential but monotonic ordering, or other representations or orderings.

For illustrating embodiments as disclosed, this simplified representation will be sufficient. However it will be understood that an inverted index may be more complex, including information such as the number of times a word is contained in an object, and the position of each instance within the object, or other data. There may also be many other columns for other words (e.g., which are not pertinent to this example search), etc. Other types and more complex indices are fully contemplated herein and embodiments as disclosed may be equally effectively utilized with such indices.

Assume now that a user performs a search of the corpus of objects represented by the inverted index of FIG. 5. In particular this search may utilize an embodiment of a subset operator to search for 3 (e.g., N or the threshold value) or more of the 5 terms: rivers, lakes, rainfall, ponds, stream, (e.g.: a search for "subset (3, rivers, lakes, rainfall, ponds, stream)").

Looking at FIG. 6, the steps in the execution of one embodiment of a method for a subset iterator are illustrated for the example data of FIG. 5. The column on the left (Operation) identifies the action taken. The other columns are associated with term iterators for each of the terms of the search. Here, there are five term iterators, one for each term of interest: rivers, lakes, rainfall, ponds, stream. Each of the term iterators is responsible for traversing the inverted index (e.g., the example inverted index of FIG. 5) for a corresponding term, advancing to the next object in the list containing the corresponding term when the next interface of the iterator is accessed (e.g., returning the identifier for that object). Thus, the values of each of the rows for each term iterator depict the current object indicator value (e.g., identifier for an object) for the term iterator of the column at the point when the action of the row in the Operation column is taken. The rightmost column indicates when a matching value is found—which occurs when three or more term iterators share the same current indicator value (e.g., identifier for an object).

From an inspection of FIG. 5 above, it can be seen that there are four objects with identifiers 5, 13, 23 and 30 that match the initial search query. For embodiments of a subset iterator, the principle is to advance the sub-node term iterator(s) with the lowest current object indicator value, in this case checking for three or more term iterators with identical current object indicator values. Initially, the sub-node term iterators are initialized by setting their current object indicator values to 0 and the subset iterator has its current indicator set to 0 (STEPS 410, 420). Additionally, the threshold value for the subset iterator is set to 3. The term iterators can then be advanced until there are no more objects (LOOP 430). In the table of FIG. 6, the values which are changed on each row are highlighted.

Specifically, as each term iterator may have a current object indicator value of 0 and the current indicator of the subset iterator is also zero all the term iterators (rivers, lakes, rainfall, ponds, stream) may be advanced (next 0 row) (LOOP 440). The term iterators traverse the inverted index and return current object indicator values (e.g., identifiers) of, respectively, 1 (rivers), 5 (lakes), 1 (rainfall), 3 (ponds) and 2 (stream). In this example, the current indicator for the subset iterator will be set to the minimum of the current object indicator values for the term iterators (here, 1) (STEP 450). In this case there are two iterators with a current object indicator value of 1, which is fewer than the threshold of 3 needed to match (STEP 460).

The iteration continues by advancing the appropriate iterators (LOOP 440). In this example, the current indicator for the subset iterator has been set to 1 so the two term iterators with a current object indicator value of 1 (rivers and rainfall) are advanced (e.g., by calling the next interface of these term iterators) to the respective next object that contains that term (next 1). In this case, the current object indicator value (e.g., object identifier) of the rivers term iterator is 7 and 2 for the rainfall term iterator. Here, the current indicator for the subset iterator will be set to the minimum of the current object indicator values for the term iterators (here, 2) (STEP 450). In this case, there are two term iterators ("rainfall" and "stream") with a current object indicator value of 2, which is fewer that the threshold of 3 needed to match (STEP 460).

The iteration continues by advancing the appropriate iterators (LOOP 440). In this example, the current indicator for the subset iterator has been set to 2 so the two term iterators with a current object indicator value of 2 (rainfall and stream) are advanced (e.g., by calling the next interface of these term iterators) to the respective next object that contains that term (next 2)). In this case, the current object indicator value (e.g., object identifier) of the rainfall term iterator is 5 and 8 for the stream term iterator. Here, the current indicator for the subset iterator will be set to the minimum of the current object indicator values for the term iterators (here, 3) (STEP 450). In this case, there is only one term iterator (ponds) with a current object indicator value of 3, which is fewer that the threshold of 3 needed to match (STEP 460).

Again, iteration continues by advancing the appropriate iterators (LOOP 440). In this example, the current indicator for the subset iterator has been set to 3, so the term iterator with a current object indicator value of 3 (ponds) is advanced (e.g., by calling the next interface of this term iterator) to the respective next object that contains that term (next 3). In this case, the current object indicator value (e.g., object identifier) of the pond term iterator is 5. Here, the current indicator for the subset iterator will be set to the minimum of the current object indicator values for the term iterators (here, 5) (STEP 450). In this case, there are 3 iterators (lakes, rainfall and ponds) with a current object indicator value of 5, which is equal to the threshold of 3 needed to identify a match (STEP 460). Accordingly, the object associated with identifier 5 is identified (e.g., recorded or returned) as a matching object for the search (STEP 470). These steps may repeat as depicted in FIG. 6 until the end of the objects indexed in the inverted index is reached.

It will be noted that while in certain embodiments a subset iterator and methods for implementing the same have been depicted, other embodiments may be possible, including those embodiments that optimize certain aspects of these embodiments. For example, these optimizations may occur with respect to how the term iterators are advanced. In particular, in one embodiment, once a threshold number of term iterators have current indicator values that are the same a match will be recorded for the object associated with that current indicator value.

For example, imagine the 5 term iterators as discussed above had the values: 7, 7, 3, 7, 9 respectively. In one embodiment, the object associated with the identifier 7 would not be identified as a match at this point because only the lowest current indicator value (here 3) is examined for a threshold number of term iterators. However, in another embodiment the step of advancing the term iterator associated with current indicator value of 3 until a current indicator value of 7 is the lowest value across the term iterators, since it may be impossible to get the threshold of 3 or more term iterators having the same current indicator value for any current indicator value of less than 7. Similarly, embodiments could terminate once enough term iterators reached a point where a threshold number of term iterators having the same current indicator value is impossible. Other optimizations may be possible.

Other variations may also be possible as well. For example, in one embodiment, a subset iterator may identify an object as matching if a threshold number of term iterators have the same current object indicator value (e.g., object identifier). In another embodiment, it can be determined how many of the term iterators (e.g., more than the threshold value) will return the same current object indicator value. This data may be used to perform or affect a relevance computation associated with the object or objects of the corpus. To illustrate, the example above skips ahead immediately upon finding 3 or more term iterators with the same current object indicator value. Another embodiment may proceed to determine if 4 or 5 values could be matched, and return this information to affect relevance computation. In practice, matching all 5 values might be considered more relevant than matching only 3 values.

The illustrated embodiment also uses simple iterators that work on inverted indexes and words. In other embodiments, an iterator could be comprised of one or more sub-trees of other iterators, allowing an arbitrarily complex search query to be performed as a component of the subset operation. Iterators might also work on non-word data types, such as numeric or date range matching. A specific example of this concept to illustrate might be the application of stemming. Imagine that stemming expansion of the word "lakes" matched the words "lake", "lakes", "laked". Instead of an iterator for "lakes", an iterator tree that performed (lake OR lakes OR laked) would be used in its place. This use of sub-trees may be important. Assume a document contained only the words: lake, lakes, rivers. In a subset processing with stemming of the word lake, the presence of both words lake and lakes may not count as two matches, but instead only count as 1 match.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, that follow, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A search system, comprising:
    a processor;
    a data store, having a corpus and an index of the corpus stored thereon, the corpus comprising a set of objects, each object having a corresponding identifier the index including a set of terms, each of the set of terms associated with one or more identifiers of objects which include that term;
    a computer readable medium, having instructions for:
        receiving a search query having a set of search terms and a subset operator, the subset operator including a threshold and the set of search terms, wherein the threshold defines an amount of search terms of the set of search terms that are present in each object of the set of objects that satisfies the subset operator and the subset operator is executable for finding each object of the set of objects that includes the amount of search terms, wherein the amount of search terms is specified as a number value or a percentage value of the set of search terms; and
        executing the subset operator by:
        generating a search tree based on the set of search terms, the search tree having a subset operator node including a subset process configured according to the threshold, wherein the subset operator node includes a set of sub-nodes, each sub-node comprising a term process for a respective search term in the set of search terms;
        executing the search tree using the index to determine one or more objects of the set of objects that satisfy the subset operator, wherein executing the search tree comprises:
    for each term process:
        identifying a result for that term process using the index, the result identifying one or more objects of the set of objects that include the respective term for that term process; and
        returning the identified result for that term process identifying the one or more objects that include the respective term for that term process; and
    executing the subset process by:
    evaluating the results returned by each of the term processes by combining the respective results returned by each of the term processes to determine each of the one or more objects having the amount of terms in the set of search terms equal or greater than the amount of search terms defined by the threshold; and
        returning the identifiers for the one or more objects determined by the subset process that satisfy the subset operator.

2. The search system of claim 1, wherein each of the term processes is an iterator configured to evaluate the set of objects according to an order of the identifiers of the objects and the result is an identifier of the next object containing the search term associated with the term process according to the order.

3. The search system of claim 2, wherein the identifiers are numerical and the order of the identifiers is sequentially from lowest to highest.

4. The search system of claim 3, wherein the subset process is configured to call each of the term processes to determine the result for that term process.

5. The search system of claim 4, wherein evaluating the results from each of the term processes further comprises determining if a number of returned respective results from each of the term processes with a minimum value is equal to, or exceeds, the threshold and if so, adding the object in the retuned respective result associated with the identifier to the one or more objects determined by the subset process that satisfy the subset operator.

6. The search system of claim 5, wherein the subset process obtains a next result from each term process whose result is the minimum value of all the results returned by the term processes.

7. A non-transitory computer readable medium, comprising instructions for:
   storing a corpus and an index of the corpus in a data store, the corpus comprising a set of objects, each object having a corresponding identifier the index including a set of terms, each of the set of terms associated with one or more identifiers of objects which include that term;
   receiving a search query having a set of search terms and a subset operator, the subset operator including a threshold and the set of search terms, wherein the threshold defines an amount of search terms of the set of search terms that are present in each object of the set of objects that satisfies the subset operator and the subset operator is executable for finding each object of the set of objects that includes the amount of search terms, wherein the amount of search terms is specified as a number value or a percentage value of the set of search terms; and
   executing the subset operator by:
     generating a search tree based on the set of search terms, the search tree having a subset operator node including a subset process configured according to the threshold, wherein the subset operator node includes a set of sub-nodes, each sub-node comprising a term process for a respective search term in the set of search terms;
     executing the search tree using the index to determine one or more objects of the set of objects that satisfy the subset operator, wherein executing the search tree comprises:
   for each term process:
     identifying a result for that term process using the index, the result identifying one or more objects of the set of objects that include the respective term for that term process; and
     returning the identified result for that term process identifying the one or more objects that include the respective term for that term process; and
   executing the subset process by:
     evaluating the results returned by each of the term processes by combining the respective results returned by each of the term processes to determine each of the one more objects having the amount of terms in the set of search terms equal or greater than the amount of search terms defined by the threshold; and
     returning the identifiers for the one or more objects determined by the subset process that satisfy the subset operator.

8. The non-transitory computer readable medium of claim 7, wherein each of the term processes is an iterator configured to evaluate the set of objects according to an order of the identifiers of the objects and the result is an identifier of the next object containing the search term associated with the term process according to the order.

9. The non-transitory computer readable medium of claim 8, wherein the identifiers are numerical and the order of the identifiers is sequentially from lowest to highest.

10. The non-transitory computer readable medium of claim 9, wherein the subset process is configured to call each of the term processes to determine the result for that term process.

11. The non-transitory computer readable medium of claim 10, wherein evaluating the results from each of the term processes further comprises determining if a number of returned respective results from each of the term processes with a minimum value is equal to, or exceeds, the threshold and if so, adding the object in the retuned respective result associated with the identifier to the one or more objects determined by the subset process that satisfy the subset operator.

12. The non-transitory computer readable medium of claim 11, wherein the subset process obtains a next result from each term process whose result is the minimum value of all the results returned by the term processes.

13. A method for implementing a subset search on a search system, comprising:
   storing a corpus and an index of the corpus in a data store, the corpus comprising a set of objects, each object having a corresponding identifier the index including a set of terms, each of the set of terms associated with one or more identifiers of objects which include that term;
   receiving a search query having a set of search terms and a subset operator, the subset operator including a threshold and the set of search terms, wherein the threshold defines an amount of search terms of the set of search terms that are present in each object of the set of objects that satisfies the subset operator and the subset operator is executable for finding each object of the set of objects that includes the amount of search terms, wherein the amount of search terms is specified as a number value or a percentage value of the set of search terms; and
   executing the subset operator by:
     generating a search tree based on the set of search terms, the search tree having a subset operator node including a subset process configured according to the threshold, wherein the subset operator node includes a set of sub-nodes, each sub-node comprising a term process for a respective search term in the set of search terms;
     executing the search tree using the index to determine one or more objects of the set of objects that satisfy the subset operator, wherein executing the search tree comprises:
   for each term process:
     identifying a result for that term process using the index, the result identifying one or more objects of the set of objects that include the respective term for that term process; and
     returning the identified result for that term process identifying the one or more objects that include the respective term for that term process; and
   executing the subset process by:
     evaluating the results returned by each of the term processes by combining the respective results returned by each of the term processes to determine each of the one more objects having the amount of terms in the set of search terms equal or greater than the amount of search terms defined by the threshold: and
     returning the identifiers for the one or more objects determined by the subset process that satisfy the subset operator.

14. The method of claim 13, wherein each of the term processes is an iterator configured to evaluate the set of objects according to an order of the identifiers of the objects and the result is an identifier of the next object containing the search term associated with the term process according to the order.

15. The method of claim 14, wherein the identifiers are numerical and the order of the identifiers is sequentially from lowest to highest.

16. The method of claim 15, wherein the subset process is configured to call each of the term processes to determine the result for that term process.

17. The method of claim 16, wherein evaluating the results from each of the term processes further comprises determining if a number of returned respective results from each of the term processes with a minimum value is equal to, or exceeds, the threshold and if so, adding the object in the retuned respective result associated with the identifier to the one or more objects determined by the subset process that satisfy the subset operator.

18. The method of claim 17, wherein the subset process obtains a next result from each term process whose result is the minimum value of all the results returned by the term processes.

* * * * *